(12) United States Patent
Bush et al.

(10) Patent No.: US 11,300,974 B2
(45) Date of Patent: Apr. 12, 2022

(54) PERCEPTION METHODS AND SYSTEMS FOR LOW LIGHTING CONDITIONS

(71) Applicant: GM GLOBAL TECHNOLOGY OPERATIONS LLC, Detroit, MI (US)

(72) Inventors: Lawrence A. Bush, Shelby Township, MI (US); Upali P. Mudalige, Oakland Township, MI (US); Zachariah E. Tyree, Shelby Township, MI (US); Wei Tong, Troy, MI (US); Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 329 days.

(21) Appl. No.: 16/515,592

(22) Filed: Jul. 18, 2019

(65) Prior Publication Data

US 2021/0018928 A1    Jan. 21, 2021

(51) Int. Cl.
| | | |
|---|---|---|
| G05D 1/02 | (2020.01) | |
| G05D 1/00 | (2006.01) | |
| B60Q 1/076 | (2006.01) | |
| G06V 20/58 | (2022.01) | |

(52) U.S. Cl.
CPC .......... G05D 1/0246 (2013.01); B60Q 1/076 (2013.01); G05D 1/0088 (2013.01); G05D 1/0257 (2013.01); G06V 20/58 (2022.01)

(58) Field of Classification Search
CPC .. G05D 1/0246; G05D 1/0088; G05D 1/0257; G06K 9/00805; B60Q 1/076; B60Q 2300/45; B60Q 1/085
See application file for complete search history.

(56) References Cited

U.S. PATENT DOCUMENTS

| | | | |
|---|---|---|---|
| 8,827,514 B2 * | 9/2014 | Takagaki | G06K 9/00825 362/466 |
| 9,201,421 B1 * | 12/2015 | Fairfield | G07C 5/008 |
| 2007/0176080 A1 * | 8/2007 | Schofield | G01J 3/51 250/208.1 |
| 2015/0091439 A1 * | 4/2015 | Wright | B60Q 1/143 315/82 |

(Continued)

FOREIGN PATENT DOCUMENTS

DE        102009054243 A1 *   5/2011    ............. B60Q 1/143

OTHER PUBLICATIONS

Machine Translation of DE102009054243 retrieved from Espacenet on Jul. 17, 2021 (Year: 2021).*

*Primary Examiner* — Thomas Ingram
(74) *Attorney, Agent, or Firm* — Lorenz and Kopf LLP

(57) ABSTRACT

Methods and systems are provided for detecting objects within an environment of a vehicle. In one embodiment, a method includes: receiving, by a processor, image data sensed from the environment of the vehicle; determining, by a processor, an area within the image data that object identification is uncertain; controlling, by the processor, a position of a lighting device to illuminate a location in the environment of the vehicle, wherein the location is associated with the area; controlling, by the processor, a position of one or more sensors to obtain sensor data from the location of the environment of the vehicle while the lighting device is illuminating the location; identifying, by the processor, one or more objects from the sensor data; and controlling, by the processor, the vehicle based on the one or more objects.

16 Claims, 5 Drawing Sheets

(56) References Cited

U.S. PATENT DOCUMENTS

| | | | |
|---|---|---|---|
| 2016/0114720 A1* | 4/2016 | Schlaug | B60Q 1/085 |
| | | | 362/523 |
| 2016/0152174 A1* | 6/2016 | Hagisato | B60Q 1/1438 |
| | | | 362/466 |
| 2017/0185851 A1* | 6/2017 | Jeromin | H04N 13/239 |
| 2020/0180502 A1* | 6/2020 | Mitsuya | G08G 1/166 |
| 2020/0298844 A1* | 9/2020 | Ikuta | G01S 13/867 |
| 2021/0174088 A1* | 6/2021 | Maley | G06K 9/00201 |

\* cited by examiner

PERCEPTION METHODS AND SYSTEMS FOR LOW LIGHTING CONDITIONS

INTRODUCTION

The present disclosure generally relates to autonomous vehicles, and more particularly relates to systems and methods for improving perception of an environment of an autonomous vehicle during low lighting conditions.

An autonomous vehicle is a vehicle that is capable of sensing its environment and navigating with little or no user input. For example, an autonomous vehicle may include a perception system that senses its environment using sensing devices such as radar, lidar, image sensors, and the like and, based on the sensed data, observes objects and other activity within the environment. The autonomous vehicle system uses this information from the perception system and information from other systems such as global positioning systems (GPS) technology, navigation systems, vehicle-to-vehicle communication, vehicle-to-infrastructure technology, and/or drive-by-wire systems to navigate the vehicle.

In some instance, the perception system has difficulty observing the environment. For example, during low lighting conditions (e.g., at night, enclosed areas, etc.) identifying objects can be difficult; even with the help of active sensors such as Lidar because of their relatively low resolution.

Accordingly, it is desirable to provide systems and methods that provide improved perception of the vehicle environment. Furthermore, other desirable features and characteristics of the present disclosure will become apparent from the subsequent detailed description and the appended claims, taken in conjunction with the accompanying drawings and the foregoing technical field and background.

SUMMARY

Methods and systems are provided for detecting objects within an environment of a vehicle. In one embodiment, a method includes: receiving, by a processor, image data sensed from the environment of the vehicle; determining, by a processor, an area within the image data that object identification is uncertain; controlling, by the processor, a position of a lighting device to illuminate a location in the environment of the vehicle, wherein the location is associated with the area; controlling, by the processor, a position of one or more sensors to obtain sensor data from the location of the environment of the vehicle while the lighting device is illuminating the location; identifying, by the processor, one or more objects from the sensor data; and controlling, by the processor, the vehicle based on the one or more objects.

In various embodiments, the one or more sensors comprise a camera and a lidar or ridar.

In various embodiments, the position of the lighting device includes at least one of a yaw, and a pitch relative to the vehicle.

In various embodiments, the position of the one or more sensors includes at least one of a yaw, a pitch, and a roll relative to the vehicle.

In various embodiments, the method includes determining a priority of the area, and wherein the controlling the position of the lighting device and the controlling the position of the one or more sensors is based on the priority of the area.

In various embodiments, the determining the priority is based on lidar data sensed from the environment of the vehicle.

In various embodiments, the determining the priority is based on a location of the area relative to lane of travel of the vehicle.

In various embodiments, the determining the priority is based on a detected potential object in the area.

In various embodiments, the determining the area within the image that object detection is uncertain is based on a pixel value for threshold amount of pixels within the image.

In another embodiment, a computer implemented system for detecting objects within an environment of a vehicle, includes: a computer readable medium configured to store instructions; and a processor configured to perform the instructions, the instructions when performed, receive image data sensed from the environment of the vehicle, determine an area within the image data that object identification is uncertain, control a position of a lighting device to illuminate a location in the environment of the vehicle, wherein the location is associated with the area, control a position of one or more sensors to obtain sensor data from the location of the environment of the vehicle while the lighting device is illuminating the location, identify one or more objects from the sensor data, and control the vehicle based on the one or more objects.

In various embodiments, the one or more sensors comprise a camera and a lidar or a radar.

In various embodiments, the position of the lighting device includes at least one of a yaw, and a pitch relative to the vehicle.

In various embodiments, the position of the one or more sensors includes at least one of a yaw, a pitch, and a roll relative to the vehicle.

In various embodiments, the instructions determine a priority of the area, and wherein the controlling the position of the lighting device and the controlling the position of the one or more sensors is based on the priority of the area.

In various embodiments, the instructions determine the priority based on lidar data sensed from the environment of the vehicle.

In various embodiments, the instructions determine the priority based on a location of the area relative to lane of travel of the vehicle.

In various embodiments, the instructions determine the priority based on a detected potential object in the area.

In various embodiments, the instructions determine the area within the image that object detection is uncertain is based on a pixel value for threshold amount of pixels within the image.

In another embodiment, an autonomous vehicle includes: a camera that senses image data from an environment of the autonomous vehicle; at least one of a lidar and a radar that senses sensor data from the environment of the vehicle; a steerable lighting device that selectively illuminates the environment of the vehicle; and a controller configured to, by a processor, receive image data sensed from the environment of the vehicle, determine an area within the image data that object identification is uncertain, control a position of the lighting device to illuminate a location in the environment of the vehicle, wherein the location is associated with the area, control a position of the camera and the at least one of lidar and radar to obtain the image data and the sensor data from the location of the environment of the vehicle while the lighting device is illuminating the location, identify one or more objects from the sensor data, and control the vehicle based on the one or more objects.

In various embodiments, the camera, the at least one of lidar and radar, and the lighting device are movably coupled to the vehicle, and wherein the position is relative to the vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
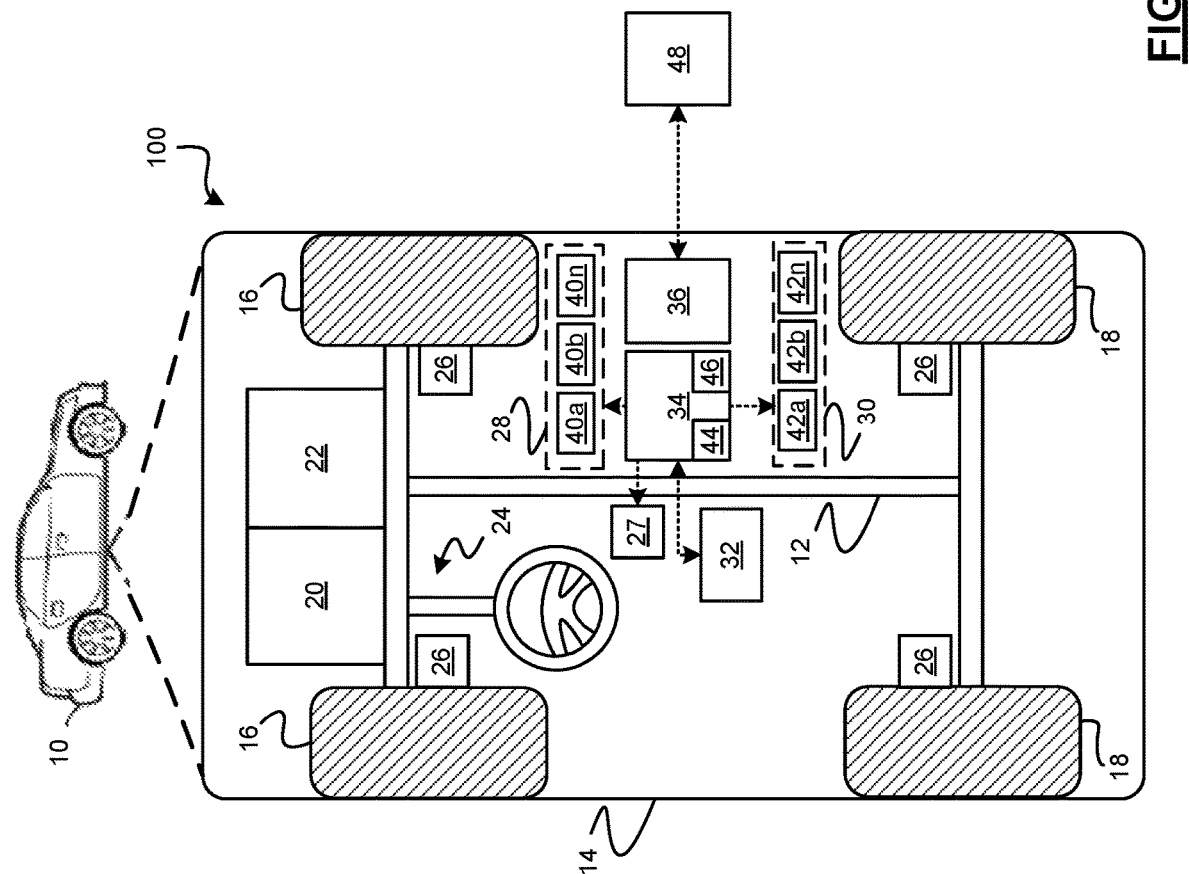
FIG. 1 is a functional block diagram illustrating an autonomous vehicle having a perception system, in accordance with various embodiments.

With reference to FIG. 1, a perception system in accordance with the present disclosure is shown generally at 100 and is associated with a vehicle 10 in accordance with various embodiments. In general, the perception system 100 generates an attention signal, to steer spot-lights, headlights, or other exterior lighting of the vehicle 10 to identified areas of the vehicle's environment, to illuminate low lit areas and improve the resulting observations sensors directed to those areas of the environment. The vehicle 10 intelligently controls the vehicle 10 based on the improved resulting observations.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the perception system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensing devices 40a-40n can include one or more optical cameras, high resolution lidar sensors, and low resolution lidar sensors.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). In various embodiments, the vehicle features include exterior lighting devices 27 such as, but not limited to, headlights or spotlights that project light towards the environment of the vehicle 10. In various embodiments, the vehicle features can include positioning devices that movably couple one or more of the sensing devices 40a-40n, and/or the lighting devices 27 and to adjust a pitch, a yaw, and/or a roll of the associated sensing device 40a-40n and/or the lighting devices 27 relative to the vehicle 10.

Figure 2:
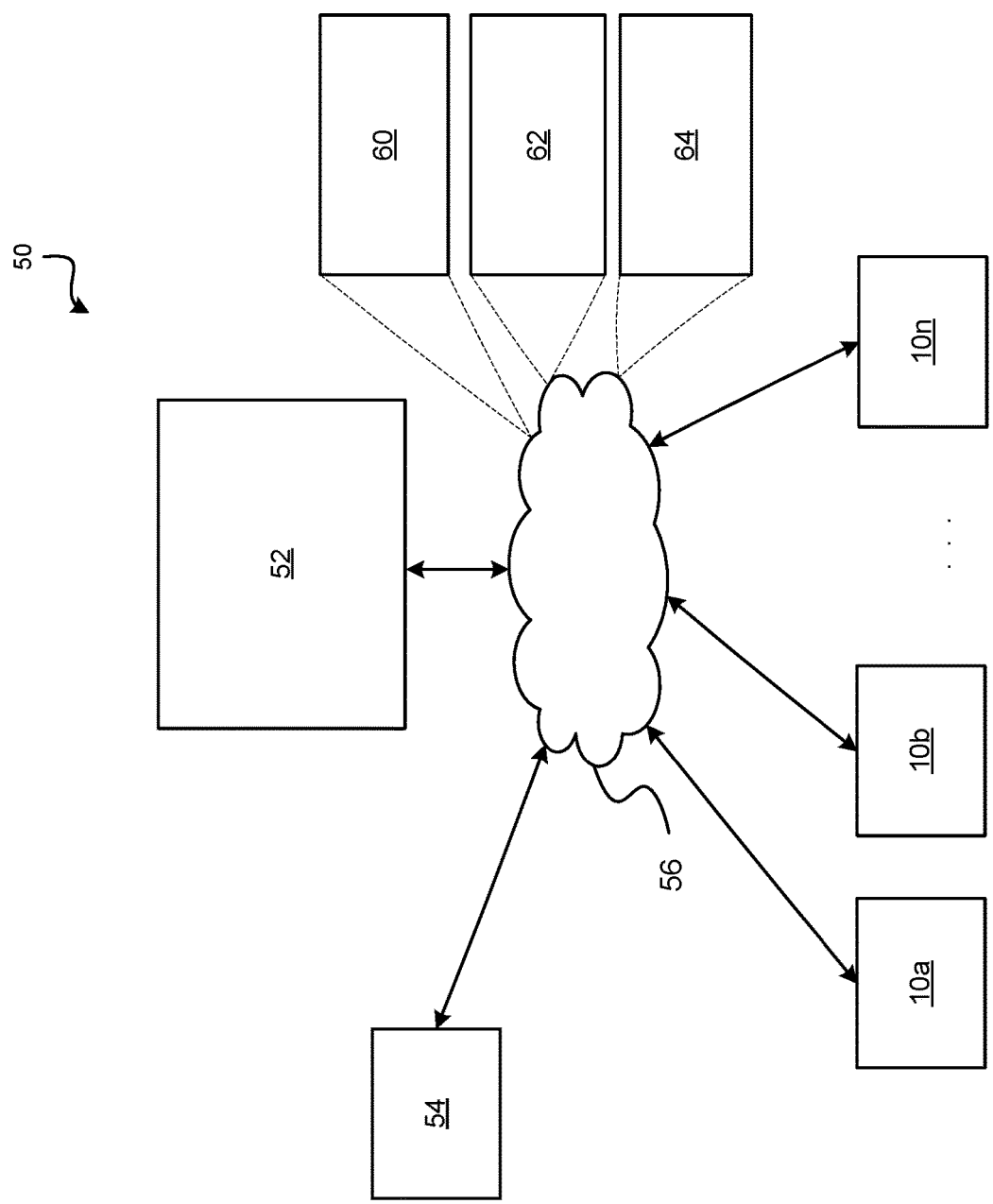
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down.

The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the perception system 100 and, when executed by the processor 44, generate an attention signal, to steer, via one or more of the actuator devices 42a-42n, the exterior lighting devices 27 of the vehicle 10 and/or one or more sensing devices 40a-40n to an identified area. The instructions further generate signals to illuminate the lighting devices 27 towards low lit areas or other uncertain areas and improve the resulting observations by the sensing devices 40a-40n directed towards the area.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
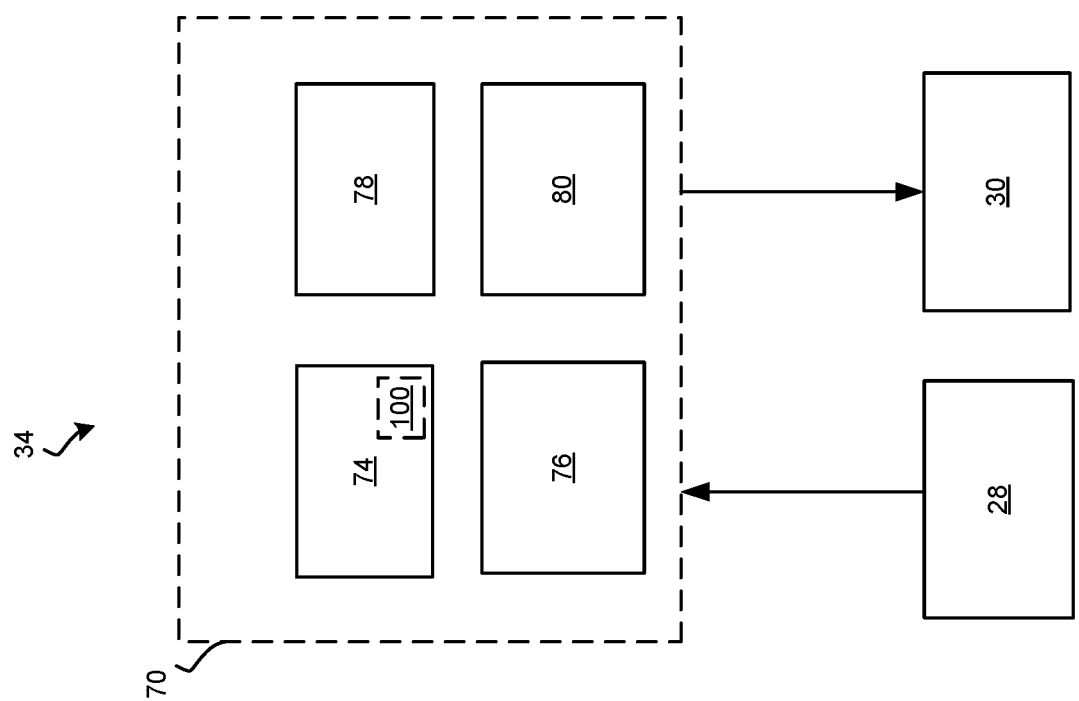
FIGS. 3 and 4 are dataflow diagrams illustrating an autonomous driving system that includes the perception system of the autonomous vehicle, in accordance with various embodiments.

In accordance with various embodiments, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, all or parts of the perception system 100 of FIG. 1 is included within the ADS 70, for example, as part of the computer vision system 74.

Figure 4:
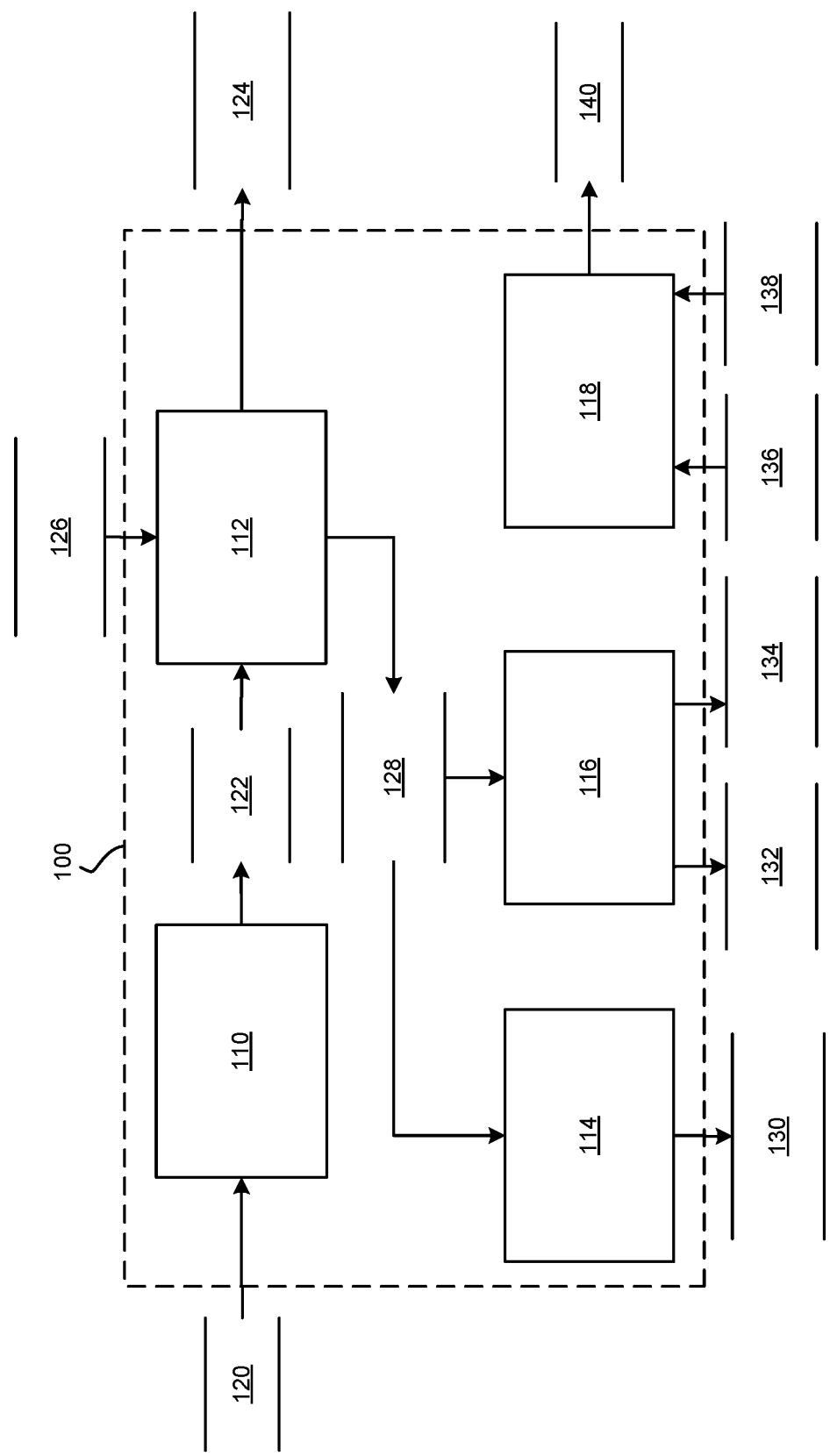

For example, as shown in more detail with regard to FIG. 4 and with continued reference to FIGS. 1-3, the perception system 100 includes an image uncertainty estimation module 110, an uncertain object determination module 112, a lighting device position control module 114, a multi-sensor position control module 116, and an object recognition module 118. As can be appreciated, any of the modules shown may be combined and/or further partitioned in various embodiments. In various embodiments, inputs to the modules may be received from the sensor system 28, received from other controllers 34 (not shown) within the vehicle 10, and/or received from other modules within the controller 34 of the vehicle 10.

In various embodiments, the image uncertainty estimation module 110 receives as input image data 120. The image data 120 may be provided by a camera or other imaging device of the sensor system 28. The image uncertainty estimation module 110 processes the image data 120 and determines any areas within the image where object detection is uncertain. For example, when low light conditions exist many pixels in the resulting image may provide a solid, dark color. The image uncertainty estimation module 110 produces uncertainty map data 122 indicating uncertain areas within the image translated into a map or real-world coordinates.

The uncertain object determination module 112 receives as input the uncertainty map data 122. The uncertain object determination module 112 generates active sensor control signals 124 to control an active sensor to obtain active sensor data 126 from the environment within the identified uncertain area. In various embodiments the active sensor is a low resolution lidar sensor of the sensor system 28.

The uncertain object determination module 112 processes the active sensor data 126 to determine if a potential object may be present within the uncertain area, and to prioritize or rank the uncertain areas based on the location of the area and/or the potential presence of an object. For example, the uncertain object determination module 112 processes the active sensor data 126 to determine if any of the data indicates the presence of a potential object. In another example, the uncertain object determination module 112 process the active sensor data 126 to determine a location of the uncertain areas relative to a current lane of travel of the vehicle 10. For example, uncertain areas may be identified as off road, in the same lane, in opposing lane, off in a distance, etc. The uncertain object determination module then uses the identified object and/or location of the uncertain area to prioritize the uncertain areas and provide object location and priority data 128. For example, areas located in the same lane as the vehicle 10 and including a potential object may be given a highest priority, areas located in an opposing lane to the vehicle and identifying a potential object may be given a next highest priority, potential objects located off in a distance may be given a next highest priority, and so on.

The lighting device position control module 114 receives as input the location and priority data 128. Based on the inputs, the lighting device position control module 114 determines a position in the environment to focus the lighting device 27. For example, the lighting device position control module 114 selects the uncertain area with the highest priority and determines a position based on the location associated with the selected uncertain area. The lighting device position control module 114 generates control signals 130 that control the actuator devices associated with the lighting device 27 to adjust the current position of the lighting device 27 to the determined position and/or to activate the lighting device 27 such that the uncertain area is illuminated.

The multi-sensor control module 116 receives as input the location and priority data 128. Based on the inputs, the multi-sensor control module 116 determines a position to place sensors such that the location of the uncertain area can be re-sensed, now that the area has been illuminated. In various embodiments, the sensors can include a camera and a high resolution lidar beam of the sensor system 28. For example, the multi-sensor control module 116 selects the uncertain area with the highest priority and determines a position based on the location associated with the uncertain area. The multi-sensor position control module 116 generates control signals 132, 134 that control the actuator devices associated with the sensors to adjust the current position of the sensors to the determined positions and/or to activate the sensors such that the uncertain area is sensed.

The object recognition module 118 receives sensor data 136, 138 from the controlled sensors, for example the camera and the high resolution lidar. The object recognition module 118 processes the sensor data 136, 138 from the camera to determine contextual information associated with the area. The object recognition module 118 processes the sensor data from the high resolution lidar to determine depth information associated with the area. The object recognition module 18 fuses the contextual information and the depth information to create an indication of an object within the area. The fused information is then processed using one or more machine learning methods to identify and/or classify the object within the area. Any identified objects are then provided as object data 140 to other control systems for controlling operation of and navigating the vehicle 10.

Figure 5:
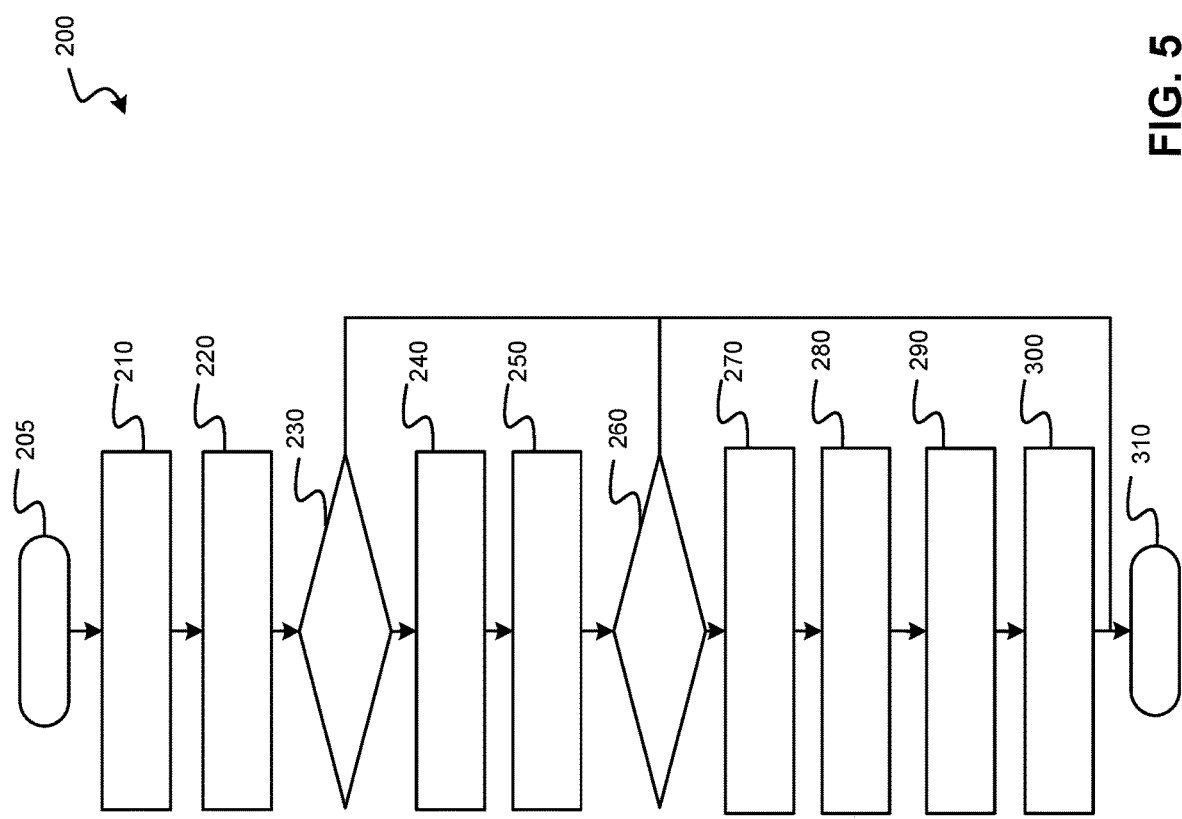
FIG. 5 is a flowchart illustrating a control method for controlling the autonomous vehicle, in accordance with various embodiments.

Referring now to FIG. 5, and with continued reference to FIGS. 1-4, a flowchart illustrates a control method 200 that can be performed by the perception system 100 of FIG. 1 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. In various embodiments, the method 200 can be scheduled to run based on one or more predetermined events, and/or can run continuously during operation of the autonomous vehicle 10.

In one embodiment, the method may begin at 205. The image data 120 is obtained from, for example, the camera of the vehicle 10 at 210. The image data 120 is processed at 220 to identify any uncertain areas are build the uncertainty map data 122. If no uncertain areas are identified at 230, the method may end at 310. If, however, uncertain areas are identified at 230, the active sensor data 126 is obtained from, for example, a lidar sensor, for that area at 240. The active sensor data 126 is processed at 250 to confirm the presence of any uncertain objects within the uncertain area, a location of the uncertain objects, and a priority of the uncertain object, for example, as discussed above to produce the object location and priority data 128.

If no uncertain object exists or an uncertain object with low priority exists, the method may end at 310. If, however, any uncertain objects are identified, and the uncertain objects include a priority that indicates a threat at 260, a position of the lighting device 27 is determined based on the location of the uncertain object and the lighting device 27 is controlled to the determine position such that it illuminates the area in the environment associated with the uncertain object at 270. Similarly, positions of the sensors (e.g., the camera and the high resolution lidar) are determined based on the location of the uncertain object and the sensors are controlled to the positions such that they sense the area in the environment associated with the uncertain object to obtain sensor data as the camera data 136 and the lidar data 138 at 280.

Thereafter, the sensor data is processed and fused, for example, as discussed above at 2900. The fused data is then evaluated to determine object data 140 that may be used to control the vehicle 10 at 300. Thereafter, the method may end at 310.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for detecting objects within an environment of a vehicle, comprising:
   receiving, by a processor, image data sensed from the environment of the vehicle;
   determining, by a processor, an area within the image data that object identification is uncertain;
   controlling, by the processor, at least one of a yaw, a pitch, and a roll of a lighting device relative to the vehicle to illuminate a location in the environment of the vehicle, wherein the location is associated with the area;
   controlling, by the processor, at least one of a yaw, a pitch, and a roll of one or more sensors relative to the vehicle to obtain sensor data from the location of the environment of the vehicle while the lighting device is illuminating the location;
   identifying, by the processor, one or more objects from the sensor data; and
   controlling, by the processor, the vehicle based on the one or more objects.

2. The method of claim 1, wherein the one or more sensors comprise a lidar or a radar.

3. The method of claim 1, further comprising determining a priority of the area, and wherein the controlling the at least one of yaw, pitch, and roll of the lighting device and the controlling the at least one of yaw, pitch, and roll of the one or more sensors is based on the priority of the area.

4. The method of claim 3, wherein the determining the priority is based on lidar data sensed from the environment of the vehicle.

5. The method of claim 4, wherein the determining the priority is based on a location of the area relative to lane of travel of the vehicle.

6. The method of claim 4, wherein the determining the priority is based on a detected potential object in the area.

7. The method of claim 1, wherein the determining the area within the image that object detection is uncertain is based on a pixel value for threshold amount of pixels within the image.

8. A computer implemented system for detecting objects within an environment of a vehicle, comprising:
   a computer readable medium configured to store instructions; and
   a processor configured to perform the instructions, the instructions when performed, receive image data sensed from the environment of the vehicle, determine an area within the image data that object identification is uncertain, control at least one of a yaw, a pitch, and a roll of a lighting device relative to the vehicle to illuminate a location in the environment of the vehicle, wherein the location is associated with the area, control at least one of a yaw, a pitch, and a roll of one or more sensors relative to the vehicle to obtain sensor data from the location of the environment of the vehicle while the lighting device is illuminating the location, identify one or more objects from the sensor data, and control the vehicle based on the one or more objects.

9. The system of claim 8, wherein the one or more sensors comprise a lidar or a radar.

10. The system of claim 8, wherein the instructions determine a priority of the area, and wherein the controlling the at least one of yaw, pitch, and roll of the lighting device and the controlling the at least one of yaw, pitch, and roll of the one or more sensors is based on the priority of the area.

11. The system of claim 10, wherein the instructions determine the priority based on lidar data sensed from the environment of the vehicle.

12. The system of claim 11, wherein the instructions determine the priority based on a location of the area relative to lane of travel of the vehicle.

13. The system of claim 12, wherein the instructions determine the priority based on a detected potential object in the area.

14. The system of claim 8, wherein the instructions determine the area within the image that object detection is uncertain is based on a pixel value for threshold amount of pixels within the image.

15. An autonomous vehicle, comprising:
   a camera that senses image data from an environment of the autonomous vehicle;

at least one of a lidar and a radar that senses sensor data from the environment of the vehicle;

a steerable lighting device that selectively illuminates the environment of the vehicle; and a controller configured to, by a processor, receive image data sensed from the environment of the vehicle, determine an area within the image data that object identification is uncertain, control at least one of yaw, pitch, and roll of the lighting device relative to the vehicle to illuminate a location in the environment of the vehicle, wherein the location is associated with the area, control the at least one of yaw, pitch, and roll of the camera and the at least one of lidar and radar relative to the vehicle to obtain the image data and the sensor data from the location of the environment of the vehicle while the lighting device is illuminating the location, identify one or more objects from the sensor data, and control the vehicle based on the one or more objects.

16. The autonomous vehicle of claim 15, wherein the camera, the at least one of lidar and radar, and the lighting device are movably coupled to the vehicle.

* * * * *